United States Patent [19]

Ghazey

[11] Patent Number: 4,707,731
[45] Date of Patent: Nov. 17, 1987

[54] ENCODED VIDEO TELEVISION GRAPHICS SYSTEM

[75] Inventor: John M. Ghazey, Ridgewood, N.J.

[73] Assignee: Dubner Computer Systems, Inc., Paramus, N.J.

[21] Appl. No.: 847,975

[22] Filed: Apr. 3, 1986

[51] Int. Cl.[4] .............................................. H04N 9/74
[52] U.S. Cl. ......................................... 358/22; 358/80
[58] Field of Search .................... 358/21 R, 22, 76, 80

[56] References Cited

U.S. PATENT DOCUMENTS

| | | | |
|---|---|---|---|
| 3,772,465 | 11/1973 | Vlahos et al. | 358/22 |
| 4,134,128 | 1/1979 | Hurst | 358/22 |
| 4,249,212 | 2/1981 | Ito et al. | 358/22 |
| 4,258,385 | 3/1981 | Greenberg et al. | 358/22 |
| 4,352,122 | 9/1982 | Reitmeier et al. | 358/11 |
| 4,400,719 | 8/1983 | Powers | 358/11 |
| 4,475,161 | 10/1984 | Stock | 358/80 |
| 4,500,919 | 2/1985 | Schreiber | 358/80 |
| 4,525,736 | 6/1985 | Korman | 358/28 |

FOREIGN PATENT DOCUMENTS

| | | | |
|---|---|---|---|
| 123280 | 9/1980 | Japan | 358/31 |
| 60559 | 4/1984 | Japan | 358/21 R |

Primary Examiner—John W. Shepperd
Attorney, Agent, or Firm—John Smith-Hill; Francis I. Gray

[57] ABSTRACT

A television graphics system comprises an analog-to-digital converter for digitizing an encoded analog input video signal and generating an encoded digital signal representative of the magnitude of the encoded analog input video signal at a succession of sampling points, a memory device, and a device for writing the encoded digital signal into the memory device. The graphics system also comprises a computer connected to read the encoded digital signal from the memory device, and an arithmetic unit for decoding the encoded digital signal so as to provide decoded digital signals representative of the magnitudes of the luminance and chrominance components of the analog input video signal. The computer is used to modify at least one of the decoded digital signals, and the arithmetic unit encodes the modified digital signal to generate a modified encoded digital signal representative of a modified form of the picture. The modified encoded digital signal is then written into the memory device.

9 Claims, 2 Drawing Figures

ENCODED VIDEO TELEVISION GRAPHICS SYSTEM

BACKGROUND OF THE INVENTION

In conventional television systems, the video signal is composed of a succession of lines. In the NTSC system, each field comprises 262.5 lines, and each two consecutive fields are interlaced. Thus, in one frame, comprising two fields, the entire raster of 525 lines is scanned.

Because of the relationship between subcarrier frequency and line frequency in the NTSC system, the phase relationship between subcarrier and horizontal sync repeats every four fields. If there is no motion between fields, fields 3 and 4 are identical to fields 1 and 2, except that the phase of reference subcarrier relative to horizontal sync is reversed. Therefore, a signal conforming to the standards prescribed for field 3 or 4 can be generated from a signal representing field 1 or 2 by reversing the phase of reference subcarrier, and so it is possible to generate a four field color sequence from one odd-numbered field and one even-numbered field.

In a conventional television graphics system, a composite video signal representing a picture that is to be modified in some manner is decoded into component form using a frequency-selective filter or a vertical or horizontal comb filter, and the component signals are converted to digital form and written into a frame buffer. The components may be three primary color components (R, G, B) or a luminance component and two color difference components. Because two consecutive fields of the NTSC signal can be recreated from the immediately preceding two consecutive fields, the frame buffer of the conventional television graphics system stores only two fields of the video signal. The stored data is modified in some manner to reflect the desired modification of the picture, and the modified data is read out of the frame buffer and encoded in order to recreate a four field color sequence.

Decoding of a composite video signal using a frequency-selective filter generates spurious information, because high frequency color information may be interpreted as luminance information and luminance information within the chrominance frequency band may be interpreted as color information. In a comb filter, the luminance and chrominance information are separated by forming the sum and difference of elements of the composite video signal representing different locations in the picture, e.g. two different sections of a line in the case of a horizontal comb filter, and decoding using a comb filter generates spurious information unless the color content of the picture at those different locations is precisely the same. Consequently, use of a conventional television graphics system tends to degrade the video signal.

In a conventional, component-based, television graphics system, each line is resolved into about 760 pixels in order to enable spatial frequencies of up to about 380 cycles/line to be accurately displayed. Although relatively high spatial frequencies are necessary for displaying brightness or luminance information, the human eye is much less sensitive to high frequency color information than it is to high frequency brightness information. Therefore, a substantial amount of the data stored in the frame buffer of a conventional color component (e.g. R, G, B) television graphics system does not contribute to improving the picture that is produced using the video signal generated by the graphics system.

Also, because operation of the conventional television graphics system takes place in the component domain, the operator of the system is shielded from some of the limitations that arise when the signal generated by the system is encoded into composite form and is displayed using a conventional television receiver. For example, cross-color and cross-luminance effects are not observed when a component video signal is used to drive a component monitor, and therefore the operator of the system may be less sensitive to these effects than an operator using a monitor that receives encoded video signals.

In recent years it has become common to use a frame synchronizer in order to synchronize composite video signals received from different sources, so as to enable switching between sources without undue degradation of the output video signal from the switcher. A frame synchronizer includes a digital memory into which one of the video signals is written, and it is read out in synchronism with the other video signal. Frame synchronizers operate in the composite domain, typically sampling the video signal at four times subcarrier frequency (910 samples/line in the case of the NTSC system). However, frame synchronizers are pure delay devices, and do not provide any means for purposefully modifying the picture represented by the video signal.

A television production switcher may have associated with it a digital video effects (DVE) system that includes a frame store. The DVE system enables one or more pictures, represented by one or more video signals, to be modified, e.g. by keying a foreground scene of one picture over a background scene of another picture. However, the DVE system operates in the component domain and it is not able to perform synthetic graphics operations.

SUMMARY OF THE INVENTION

In a preferred television graphics system embodying the invention, an encoded analog input video signal representing a picture is digitized to generate an encoded digital signal representative of the magnitude of the encoded analog input signal at a succession of sampling intervals, and the encoded digital signal is written into a memory device. The encoded digital signal is then modified by reading the encoded digital signal from the memory device and decoding the encoded digital signal so as to provide decoded digital signals representative of the magnitudes of the luminance and chrominance components of the analog input video signal. At least one of the decoded digital signals is modified and the modified digital signal is encoded to generate a modified encoded digital signal. The modified encoded digital signal is written into the memory device.

BRIEF DESCRIPTION OF THE DRAWING

For a better understanding of the invention, and to show how the same may be carried into effect, reference will now be made, by way of example, to the accompanying drawing, in which.

DETAILED DESCRIPTION

Figure 1:
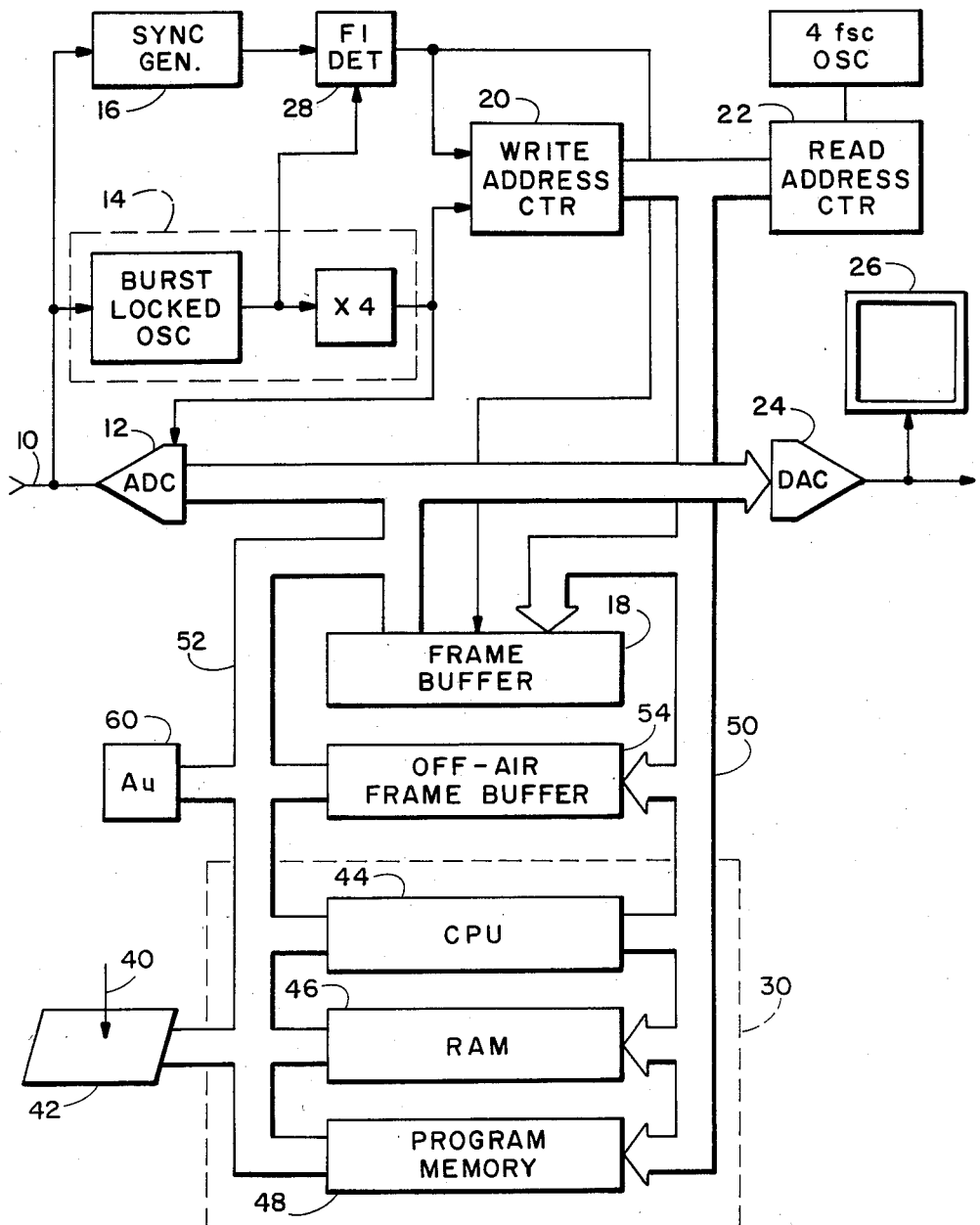
FIG. 1 is a block diagram of a television graphics system embodying the present invention.

The television graphics system shown in the drawing has an input terminal 10 at which it receives a composite video signal in accordance with the NTSC standard. The signal conforms to EIA proposed standard RS-170A. Consequently, on each horizontal line of the video signal the sync point coincides with a zero crossing (positive or negative slope) of the reference subcarrier (the continuous wave signal at subcarrier frequency and in phase with burst); and on line 10 of field 1 the horizontal sync point is aligned with a positive-going zero crossing of the reference subcarrier. The incoming video signal is applied to an analog-to-digital converter (ADC) 12 which digitizes to eight bits. The incoming video signal is also applied to a clock generator 14, comprising a burst-locked oscillator and a frequency multiplier, which generates clock pulses at four times subcarrier frequency (4 $f_{sc}$), and to a sync generator 16, which generates pulse trains that are locked to horizontal and vertical sync of the incoming video signal. The pulse trains that are generated by the sync generator 16 include a vertical drive pulse train composed of pulses that occur at field rate, starting at the beginning of line 1 of each field and having a duration of 1OH (where H is the horizontal interval).

The output signal of the burst-locked oscillator and the vertical drive pulse train from the sync generator 16 are applied to a field 1 detector 28. The field 1 detector examines the reference subcarrier at the end of the vertical drive pulse. If the reference subcarrier is at a positive-going zero crossing, this indicates the start of field 1 and the field 1 detector generates a write enable signal.

The clock pulses that are generated by the clock generator 14 are also used to control the sampling of the analog video signal by the ADC 12. Since subcarrier frequency ($f_{sc}$) is equal to 227.5 times line frequency, 910 samples are taken on each line of the video signal. The sample times coincide with the zero crossings and peaks (positive and negative) of the reference subcarrier. The write enable signal generated by the field 1 detector 28 is applied to a frame buffer 18 and to a write address counter 20. The write address counter, which also receives the output signal of the clock generator 14, is reset by the write enable signal and starts generating a sequence of digital words, commencing at zero, that are applied as address words to the frame buffer. Accordingly, the data words generated by the ADC 12 are written into the frame buffer 18. The frame buffer is able to store about one megabyte of data, corresponding to four fields.

The magnitude of an NTSC signal at a positive-going zero crossing of the reference subcarrier in the active picture interval is Y−V, where Y represents the magnitude of the luminance component and V represents the magnitude of one of two color difference or chrominance components. At the positive peak the magnitude is Y−U (U represents the magnitude of the other chrominance component). At the negative-going zero crossing and at the negative peak the magnitudes are Y+V and Y+U respectively. Therefore, the sequence Y−V, Y−U, Y+V, Y+U repeats endlessly through the four fields. Since the sample times coincide with the zero crossings and peaks of reference subcarrier, the data words written into memory represent the sequence Y−V, Y−U, Y+V, Y+U. Moreover, since the first address word generated by the counter 20 (at the start of field 1) is zero, the two lowest order bits of the address of a data word contain sufficient information to identify unambiguously which member of the Y−V, etc. sequence it is: if the lowest order bits of the address are 00, the data word is Y−V; if 01, the word is Y−U; if 10, Y+V; and if 11, Y+U.

The video signal that is applied to the input terminal 10 and is written into the frame buffer in digital form may be, e.g., a computer-generated video signal or a signal generated by a conventional video camera. In either case, the signal represents a picture that it is desired to modify in some manner. This modification is carried out using a computer 30 that comprises a central processing unit 44, such as a Motorola MC 68000, a random access memory 46 and a program memory 48. The computer is able to communicate with the frame buffer 18 using an address bus 50, a data bus 52 and a control bus (not shown) for reading data from the frame buffer and writing data into the frame buffer. The operator of the graphics system uses a position transducer in order to communicate with the computer 30. The position transducer may comprise a stylus 40 and a data tablet 42. A suitable data tablet is manufactured by GTCO under Model No. Dp5A-1111. When contacted by the stylus, the data tablet generates a position signal representative of the coordinates of the point at which it is contacted and a pressure signal representative of the pressure with which it is contacted. These signals are generated at a frequency of about 100 Hz and are applied to the computer 30. The position signal causes the computer to display on the monitor 26 a pointer designating the corresponding point of the picture. The operator moves the stylus until the pointer designates a desired area of the picture.

The operator can cause the graphics system to change its operating mode by "swiping" the stylus off the data tablet. A swipe is detected if the tablet does not provide a position signal for a selected time (indicating that it is not in proximity to the stylus) and immediately before the tablet stopped providing a position signal the tablet was providing a signal representing a position near one of the edges of the tablet.

In the NTSC system, the phase of reference subcarrier relative to sync is reversed on field 3 relative to field 1, and similarly is reversed on field 4 relative to field 2. Therefore, if the nth sample on line m of field 1, say, represents Y−V (i.e. the sample was taken at a positive-going zero crossing of reference subcarrier and is stored at a location for which the two lowest order address bits are 00), then the nth sample on line m of field 3 was taken at a negative-going zero crossing, is stored at a location for which the two lowest order address bits are 10, and represents Y+V. Therefore, the values of Y and V for the relevant pixel can be obtained by forming the sum and difference of the two data words. Values of Y and U or V can be derived for every pixel from the contents of the frame buffer by carrying out relatively simple mathematical operations. This technique, known as interframe decoding, is carried out using an arithmetic unit 60 that is connected to the data bus 52. The arithmetic unit 60 is turned on or off under control of the computer 30, and when on it can operate in a decode mode or an encode mode. When the arithmetic unit is on and is in the decode mode, it receives the data words written into the frame buffer for two corresponding pixels in alternate fields, i.e. fields 1 and 3 or fields 2 and 4, and forms the half sum and half difference of the pair of data words and makes the resulting values available to the computer 30. If one of the two data words represented Y+U, the other would represent Y−U; the half sum and the half difference would be equal to Y and U respectively. Similarly, values of Y and V are provided if the data words represent Y+V and Y−V.

In the encode mode, the arithmetic unit receives values of Y, U and V from the computer and forms the sums and differences to generate new words representing Y∓U and Y∓V, and makes these words available to the frame buffer. When the arithmetic unit is off, the data words representing Y∓U and Y∓V are transmitted between the frame buffer 18 and the computer 30.

It will be understood by those skilled in the art that interframe decoding only provides accurate results if there is no motion among the four fields stored in the frame buffer. In the case of a computer-generated signal this does not normally present a problem, but it may in the case of a signal generated by a video camera. In order to eliminate motion from the four field sequence stored in the frame buffer, the computer 30 first identifies areas of the picture that are not stationary from field to field by executing a motion detection algorithm. This may be achieved by carrying out both vertical and horizontal comb filtering (in the CPU 44) in addition to interframe decoding, comparing the values of Y, U and V obtained for each pixel by interframe decoding with those obtained by vertical and horizontal comb filtering, and assuming that there is motion if the values obtained by both vertical and horizontal comb filtering are different from those obtained by interframe decoding. If an area with motion is detected, the arithmetic unit is switched off and the computer 30 carries out a FIR digital low-pass filtering operation to decode the luminance and chrominance components of the pixels of fields 1 and 2 within the relevant area. New data words, using the values of Y, U and V for the pixels of fields 1 and 2 but with the signs of U and V reversed, are encoded using the arithmetic unit 60 and are written into the appropriate locations for fields 3 and 4.

When a motion-free, four field color sequence has been written into the frame buffer, the graphics system can be placed in a monitor mode or in a paint mode. In the monitor mode, the contents of the frame buffer are read out sequentially from the frame buffer under control of a read address counter 22 and converted to analog form by a digital-to-analog converter (DAC) 24. The resulting analog signal is a composite signal in accordance with the NTSC standard and is used to refresh the display on a CRT monitor 26.

In the paint mode, the computer 30 is used to modify in some purposeful manner the picture represented by the contents of the buffer 18. The different possible ways in which the picture can be modified are somewhat analogous to operations that can be performed with paint using conventional paint brushes, and for this reason the operations are referred to herein as brushes. In order to execute a paint operation, three distinct operations, namely a color selection operation, a brush selection operation and a picture modification operation, are performed. In the color selection mode, the operator selects a color; in the brush selection mode the operator selects the manner in which the selected color is to be combined with the color content of the picture stored in the frame buffer; and in the picture modification mode the operator causes the computer to combine the selected color with the color content of the stored picture in the selected manner.

In order to enter the color selection mode, the operator swipes the stylus off the tablet to the right. A section of the picture stored in the frame buffer is removed from the monitor and a picture created by the computer is placed in the window that is thus formed. The computer 30 creates the picture by calculating values of Y∓U and Y∓V for values of Y, U and V that lie within predetermined ranges of permissible values, and applying the sequence Y−V, etc. to the DAC 24 synchronously with the data read out from the frame buffer so that the computer-generated picture is displayed within the window area of the monitor screen. In the preferred embodiment of the invention, the program that is used to generate values of Y∓U and Y∓V is selected so that the computer-generated picture is a set of three vertical bars and a row of boxes. Each of the boxes shows a solid color, and the border of one of the boxes is highlighted; and the color shown by this particular box is referred to hereinafter as the "current color". Each of the bars shows gradations of color. A first bar is graded in hue with constant luminance and constant chrominance amplitude, a second is graded in chrominance amplitude with constant hue and constant luminance, and the third is graded in luminance with constant hue and constant chrominance amplitude. The constant hue, luminance and chrominance amplitude are the values of those parameters for the current color. Thus, if the current color is a light blue, the hue bar displays hues from red to blue, but all of the same lightness and saturation, the chrominance amplitude bar displays blues of different saturation, and the luminance bar displays blues of different lightness. The positions at which the hue, luminance and chrominance amplitude of the current color occur on the respective vertical bars are indicated by horizontal markers.

If the operator touches the stylus to the tablet at a position such that the pointer touches one of the vertical bars, the hue, luminance or chrominance amplitude of the current color is changed to the value corresponding to the position at which the pointer touched the bar. For example, if the current color was a light blue, and the stylus was placed on the tablet at a position such that the pointer was positioned over the hue bar at the red end, the current color would change to a light red. If the stylus is then lifted and is placed on the tablet at a position such that the pointer touches the luminance bar at the dark end, the current color changes to a dark red. When one color parameter, such as hue, changes, the other two parameters remain constant.

If, while in the color selection mode, the stylus is moved so that the pointer touches one of the other boxes, the color shown in that box becomes the current color, and that color also can be changed using the pointer and the vertical bars. The values of Y, U and V that define the color that was previously the current color are stored in the memory 46. Thus, by successively touching the boxes and changing the colors in the respective boxes, a palette of colors can be selected and the values of Y, U and V that define the selected colors are stored.

On first entering the color selection mode after loading of the graphics program, the computer enters a default condition in which the current color is a neutral gray. If the color selection mode is left, the color that was the current color immediately before leaving the color selection mode becomes the current color on re-entering the color selection mode.

The current color can be placed in another box, i.e. a box other than the one that is currently highlighted, by touching the pointer to the box and applying pressure to the stylus for a predetermined time, e.g. about 1 second. Then, two boxes show the identical color and one or both of them can be changed in a selected way using the pointer and the vertical bars. When the operator causes the paint system to leave the color selection mode and enter the brush selection mode, the color that was the current color immediately before leaving the color selection mode becomes the brush color.

There are two other ways of selecting a color for use in the picture modification mode. The first of these two ways requires the presence of a second, off-air frame buffer 54, in which a second picture is stored. In this second form of the color selection mode, the brush color varies as the stylus is moved over the tablet, and is the color of the corresponding pixel of the off-air picture. Values of Y, U and V are not stored in the memory 46, but are calculated as necessary during the picture modification operation. The third version of the color selection mode involves selecting a color from the picture stored in the frame buffer. In this mode, the pointer is used to designate the area of the picture having the desired color. The computer averages the values of Y, U and V over a small area of the picture for noise reduction purposes. The resulting averaged color is then the brush color, and the values of Y, U and V are written into the memory 46.

When a brush color has been selected, the paint system enters the brush selection mode. In order to complete the brush selection operation, three major choices must be made: the shape of the brush, the size of the brush and the type of brush must all be chosen. In the brush selection mode, the computer 30 causes the monitor to display indicia representative of the different choices that are available. These indicia may be numbers, icons or brief descriptors.

The shape of the brush determines the shape of the area of the picture that is influenced by the picture modification operation. Two major shapes, namely circular and strip-form, are available. The strip-form area remains at a constant orientation within the picture, and therefore in this case the brush is referred to as a calligraphic brush. In each case, the position within the picture of the area that is influenced by the operation depends on the position of the stylus 40. As the stylus is moved over the tablet, the area that is influenced moves.

In the case of a circular brush, the size of the brush is defined by the radius of the brush and is selected at the time that the brush is selected. In the case of a calligraphic brush, the size is the length of the strip-form area and depends on the pressure applied to the tablet by the stylus. Thus, the size of the calligraphic brush can be changed during the picture modification operation. If the calligraphic brush is selected, the orientation of the strip-form area also is selected as part of the brush selection operation.

The type of brush determines the way in which the selected brush color, defined by the vector $(Y_b, U_b, V_b)$, is combined with the color $(Y_p, U_p, V_p)$ of a pixel within the area influenced by the brush to generate a new pixel color $(Y', U', V')$. Each brush type may be regarded as a table of blend coefficients $B_y$, $B_u$ and $B_v$ for each pixel within the area of the picture that is currently influenced by the brush. Thus, for example, $Y' = Y_b \cdot B_y + Y_p(1-B_y)$. The values of $Y'$, $U'$ and $V'$ are combined to produce values of $Y' \mp U'$ and $Y' \mp V'$, and these values replace the corresponding values stored in the frame buffer for that pixel.

The illustrated graphics system provides six principal types of brush, referred to as the air brush, the solid brush, the fuzz brush, the wash brush, the luminance brush, and the window brush. If the calligraphy brush is selected, the only brush type that can be selected is the solid brush. If the brush color is selected in the second manner described above, the only brush type that can be selected is the window brush.

When the brush has been selected, the system enters the picture modification mode and the monitor once more displays the picture stored in the frame buffer. The position of the pointer, controlled by the operator through the stylus and the data tablet, determines the position of the brush within the picture. Painting is effected by reading from the frame buffer the data words $Y \mp U$, $Y \mp V$ defining the pixel colors for the area covered by the brush, decoding these data words to yield values of the components $Y_p$, $U_p$ and $V_p$ for each pixel, combining the value of each pixel component and the value of the corresponding brush component $Y_b$, $U_b$ or $V_b$ in accordance with the blend coefficients of the appropriate blend table, encoding the resultant new components $Y'$, $U'$ and $V'$ to form new data words, and writing the new data words back into the appropriate locations in the frame buffer.

When the solid brush or the air brush is selected, $B_y$, $B_u$ and $B_v$ for a given pixel each have the same value B. Therefore, the new color is represented by the vector $(Y', U', V')$ where $Y'=(1-B)Y_p+BY_b$, $U'=(1-B)U_p+BU_b$ and $V'=(1-B)V_p+BV_b$, and the values of $Y' \mp U'$ and $Y' \mp V'$, are written into the appropriate locations in the frame buffer in accordance with the two lowest order bits of the address words.

The blend coefficient B determines how strongly the brush color is blended into the picture color. When the air brush is selected, the blend weighting coefficient B is proportional to the magnitude of the pressure signal generated by the data tablet, and the constant of proportionality is selected so that the maximum value of B is 1 and its minimum value is 0. The brush color and the pixel color are mixed in linear fashion. In air brushing, the reading, summing and writing are done repeatedly, in response to each position and pressure signal from the data tablet, so long as the stylus continues to be applied to the tablet, and so the contribution of the brush color to the new color increases with time, even if the stylus pressure is low, if the stylus remains stationary on the tablet.

Figure 2:
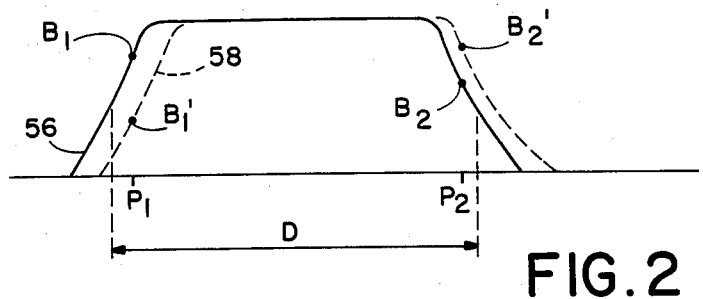
FIG. 2 is a graph for explaining one aspect of the operation of the FIG. 1 system.

When the solid brush is selected, B is equal to one, except at the edge of the brush where the value of the blend coefficient decreases monotonically to zero as shown in FIG. 2, in which the solid line 56 represents the distribution of magnitudes of the blend coefficients along a diameter D of a circular, solid brush.

It will be seen from FIG. 2 that for pixels that are spaced from the edge of the brush (i.e. within the area of the brush for which B is equal to one), the pixel values $Y_p$, $U_p$ and $V_p$ are replaced in the frame buffer by the brush values $Y_b$, $U_b$ and $V_b$, and at the edges of the brush area the pixel values are blended with the brush values in order to provide a smooth transition to the pixel color outside the brush area and thereby produce an anti-aliased picture. Even at the edges of a solid-brushed area, the blending should not be repeated if the brush remains stationary, since aliasing will cause the edge to become ragged. In order to overcome this problem, the program establishes a pixel cache in the memory 46. The pixel cache stores, on a pixel-by-pixel basis, for a limited area of the picture in the vicinity of the brush, values of B that have previously been applied to the pixel color in order to produce a blend color, and values of B that are implied for a future blend based on the current position of the stylus. In addition, the pixel cache stores the pixel values $Y_p$, $U_p$ and $V_p$ (again for the limited area of the picture) that were present in the frame buffer before the blend took place. The computer compares the value of B that has previously been applied to the pixel color with the value implied from the current position of the stylus, and if the previously-applied value is greater than the implied value a second blend, using the implied value, does not take place. For example, if the brush is initially in the position represented by the solid line 56 in FIG. 2, the blend coefficients $B_1$ and $B_2$ are used in blending the pixel values for the pixels $P_1$ and $P_2$ with the brush values and the new pixel values are written into the frame buffer, but the original pixel values for the pixels $P_1$ and $P_2$ remain in the cache. If now the brush is moved to the position represented by the dashed line 58, for pixel P1 the previously-applied value $B_1$ exceeds the implied value $B'_1$ and a second blend does not take place, whereas for pixel P2 the previously applied value $B_2$ is less than the implied value $B_2'$ and so a second blend is permitted. The value $B_2$ is replaced in the pixel cache by the value $B_2'$, which becomes the new previously-applied value for B and the value $B_2'$ is then used in blending the pixel values for the pixel P2 (stored in the cache) with the brush values and the new set of pixel values is written into the frame buffer.

The fuzz, wash, luminance and window brushes are specialized forms of the air brush described above, in that each of these brushes blends the pixel color with the brush color, rather than replacing the pixel color by the brush color. In the fuzz brush mode, the values of the components Y, U and V for the pixels in the area covered by the brush are low-pass filtered (averaged) and the color defined by the averaged components becomes the brush color. The brush color components are blended with the pixel color components in the same manner as with the normal air brush, and the new component values Y', U' and V' are combined to form the new data words $Y' \mp U'$ and $Y' \mp V$ that are written into the frame buffer. On the next blend, the values of Y, U and V for the pixels in the area covered by the brush are again averaged and the brush color is changed to the color defined by the new set of averaged components. Thus, variations in color within the area covered by the brush, or swept by the brush as the stylus is moved, are attenuated. The fuzz brush may therefore be used to remove blemishes from the picture.

The wash brush paints with chrominance only, without affecting luminance, and may be used to change the color of eyes, hair, skin etc. Therefore, a brush color is selected in the color selection mode, but by selecting the wash brush $B_y$ is set to zero and $B_u$ and $B_v$ are set to one. The luminance of the picture stored in the frame buffer is not affected by the picture modification operation but the chrominance values are replaced by the chrominance values for the brush color.

The luminance brush may be used to lighten or darken an area of the picture without altering the chrominance. In this case, a brush color is not selected, so $Y_b$, $U_b$ and $V_b$ are zero. $B_u$ and $B_v$ are set to zero. The operator must select whether to increase luminance or decrease luminance. In order to increase luminance, $B_y$ is made negative, and if $B_y$ is made positive luminance is decreased. Consequently, $Y'=(1-B_y)Y_p$, $U'=U_p$ and $V'=V_p$. In the preferred embodiment of the invention, the absolute value of $B_y$ is greater at the center of the brush than at the edge, and therefore there is a greater change in luminance for pixels at the center of the brushed area than for those at the edge. Major variations in luminance are preserved. Consequently, picture detail, which is largely perceived through variations in brightness rather than hue, is retained.

If the window brush is selected in the brush selection mode, the selected brush color for a given pixel location in the frame buffer 18 is the color of the pixel at the identical location in a second, off-air, frame buffer 54, and therefore the brush color changes as the brush moves over the picture stored in the frame buffer 18 in accordance with changes in the color of the corresponding locations of the picture stored in the off-air frame buffer. The brush color is blended with the pixel color, and therefore the effect that is provided is one of at least partially replacing the on-air picture by the off-air picture. If the stylus pressure is low, the on-air picture appears to be slightly transparent and features of the off-air picture can be seen through the on-air picture. As the pressure is increased, or the brush remains stationary, the transparency of the on-air picture increases so that the contribution of the off-air picture increases until finally the effect is of cutting a hole in the on-air picture so that the off-air picture can be seen through a window in the on-air picture.

It will be appreciated that the present invention is not restricted to the particular graphics system that has been described and illustrated, and that variations may be made therein without departing from the scope of the invention as defined in the appended claims and equivalents thereof. For example, the invention is not restricted to use of U and V as the chrominance components (U being defined by the vector along the 0° axis on a conventional vectorscope display in its normal state of adjustment and V being defined by the vector along the 90° axis), since by changing the phase relationship between reference subcarrier and the clock pulses generated by the clock generator 14 different orthogonally-disposed chrominance components, such as I and Q, will result. It is, of course, necessary that the phase relationship between reference subcarrier and the clock pulses be taken account of when generating the colors to be selected using the computer 30. Also, the invention is not restricted to use with composite signals in accordance with the NTSC format, and is applicable to other composite signal formats, e.g. the PAL format and non-broadcast formats used for tape or disc recording. It is necessary only that the signal have a luminance component and two chrominance components that modulate respective subcarriers that are in phase quadrature, and that for each field of the signal there is a succeeding field for which the phase of subcarrier is reversed, so that interframe decoding can be used. In the case of the PAL format, in which there is an eight field color sequence, it is necessary to store fields 1, 2, 5 and 6. Fields 3 and 7 can then be re-created by interframe decoding between fields 1 and 5 to obtain values of Y, U and V, and re-encoding the values of Y, U and V in the appropriate phase relationships. Similarly, fields 4 and 8 can be re-created from fields 2 and 6.

I claim:

1. A television graphics system for receiving an encoded analog input video signal representing a picture, and providing a video signal representing a modified form of the picture, comprising an analog-to-digital converter for digitizing the encoded analog input video signal and generating an encoded digital signal representative of the magnitude of the encoded analog input video signal at a succession of sampling points, a memory device, means for writing the encoded digital signal into the memory device, means for reading a selected portion of the encoded digital signal from the memory device, decoding the encoded digital signal so as to provide decoded digital signals representative of the magnitudes of the luminance and chrominance components of the analog input video signal, modifying at least one of the decoded digital signals, encoding the modified digital signal to generate a modified encoded digital signal representative of a modified form of the picture, and writing the modified encoded digital signal into the memory device.

2. A system according to claim 1, wherein the means for decoding the encoded digital signal and encoding the modified digital signal comprise an arithmetic unit connected to receive input digital words in pairs and form output digital words representing the sum and difference of a pair of input digital words.

3. A television graphics system for receiving a composite analog input video signal having a luminance component and two chrominance components encoded in a four field color sequence, comprising an analog-to-digital converter for digitizing the composite analog input video signal and generating an encoded digital signal representative of the magnitude of the composite analog input video signal at a succession of sampling points, a memory device, means for writing the encoded digital signal into the memory device, means for reading a selected portion of the encoded digital signal from the memory device, decoding the encoded digital signal so as to provide decoded digital signals representative of the magnitudes of the luminance and chrominance components of the analog input video signal, modifying at least one of the decoded digital signals, encoding the modified digital signal to generate a modified encoded digital signal, and writing the modified encoded digital signal into the memory device.

4. A system according to claim 3, wherein the means for decoding the encoded digital signal and encoding the modified digital signal comprise an arithmetic unit connected to receive input digital words in pairs and form output digital words representing the sum and difference of a pair of input digital words.

5. A system according to claim 3, for receiving a composite analog input video signal in which the chrominance components modulate respective subcarriers that are in phase quadrature with one another and in predetermined phase relationships with respect to a reference subcarrier, and wherein the system further comprises a sample strobe generator for generating sample strobe pulses at four times the frequency of the reference subcarrier and in predetermined phase relationship with respect thereto, the sample strobe pulses being applied to the analog-to-digital converter for defining the successive sampling points, and wherein the means for reading and decoding the encoded digital signal comprise means for forming the sum of and difference between the value of the encoded digital signal at a given sampling point in one frame of the four field color sequence and the value of the encoded digital signal at the corresponding sampling point in the other frame of the four field color sequence.

6. A system according to claim 3, comprising means for detecting whether the luminance and chrominance components at a sampling point in a first frame of the four field color sequence are the same as the luminance and chrominance components at a corresponding sampling point of the second frame and, in the event that the components are not equal, replacing the encoded digital signal value at the sampling point of the second frame by a digital signal value derived from the encoded digital signal value representative of the magnitude of the composite analog input video signal at the sampling point of the first frame.

7. A system according to claim 6, wherein the means for decoding the encoded digital signal and encoding the modified digital signal comprise an arithmetic unit connected to receive input digital words in pairs and form output digital words representing the sum and difference of a pair of input digital words, and wherein the detecting means comprise computer means operative to carry out a comb filtering operation using words of the encoded digital signal derived from a first frame of the composite analog input video signal and to cause the arithmetic unit to carry out an interframe decoding operation using words of the encoded digital signal derived from the first frame of the composite analog input video signal and from a second frame thereof, said computer means also being operative to compare the result of the comb filtering operation with the result of the interframe decoding operation on a point-by-point basis and, in the event that the results for a given point are not the same, carry out a notch filtering operation using words of the encoded digital signal derived from the first frame to generate luminance and chrominance components for said given point.

8. A system according to claim 3, wherein the means for modifying the decoded digital signal comprises means for forming a weighted sum of the value of the decoded digital signal and a second value.

9. A method of modifying a composite analog input video signal having a luminance component and two chrominance components, wherein the chrominance components modulate respective subcarriers that are in phase quadrature and are in predetermined phase relationships with respect to a reference subcarrier, comprising digitizing the composite analog input video signal and generating an encoded digital signal representative of the magnitude of the composite analog input video signal at a succession sampling points, writing the encoded digital signal into a memory device, reading a selected portion of the encoded digital signal from the memory device, decoding the encoded digital signal so as to provide decoded digital signals representative of the magnitudes of the luminance and chrominance components of the analog input video signal, modifying at least one of the decoded digital signals, encoding the modified digital signal to generate a modified encoded digital signal, and writing the modified encoded digital signal into the memory device.

* * * * *